2,811,408

METHOD OF MOLDING PLASTIC ARTICLES

Orville A. Braley, Midland, Mich., assignor to Dow Corning Corporation, Midland, Mich., a corporation of Michigan No Drawing. Application November 19, 1954,
Serial No. 470,137

9 Claims. (Cl. 18—47)

This invention relates to the release of molded articles from molds.

It has long been known that organopolysiloxanes particularly the methylpolysiloxanes were excellent release agents for various kinds of organic plastic materials. The superiority of the methylpolysiloxanes is exemplified by the fact that in the rubber industry they are used almost exclusively to obtain release of rubber articles. These materials are particularly efficient for releasing plastic materials from metal molds. They are also efficient to a somewhat less degree for the releasing of organic plastic articles from wood or plastic molds. However, in the latter cases the heretofore employed methylpolysiloxanes are not as efficient as is desired.

It has been one of the anomalies of the art that, in spite of the fact that polysiloxanes are themselves excellent release agents for organic plastics, there has been to date no satisfactory release agent for organosilicon resins particularly those containing phenyl groups. Inasmuch as all commercially successful high temperature organo-silicon resins contain phenyl groups this failure of release has posed a serious problem. To date the only practical method of securing such release was to employ high temperature cellophane between the mold surface and the resin. This, however, imposes serious limitations on the molding temperatures and further often causes imperfect moldings due to creases or breaks in the cellophane sheeting which cause irregularities on the surface of the molded article. With cellophane or other organic release agents the molding temperature is limited to 175° C. or less. In commercial operations it is often essential to mold articles at temperatures above 175° C. Thus to date there has been no satisfactory release agent for silicone articles molded above this temperature.

It is the object of this invention to provide a novel method of molding organic and organosilicon plastics which will provide superior release from all types of mold surfaces. Another object is to provide a method which will give satisfactory release of organosilicon resins at any molding temperature. Another object is to provide a method which gives satisfactory release of silicone resins for 15 to 20 molding cycles without retreatment of the molding surfaces. Other objects and advantages will be apparent from the following description.

In accordance with this invention a plastic article is molded in contact with molding surfaces which are coated with a composition comprising a copolymeric siloxane resin which is composed essentially of $SiO_2$ units and $Me_3SiO_{.5}$ units, said units being in such proportion that the ratio of methyl groups to silicon atoms is from 1:1 to 2.5:1 inclusive. The molded article is thereafter removed from the mold.

The essential ingredient in the process of this invention is the above defined copolymeric organosiloxane resins hereinafter referred to as the "essential siloxanes." These materials are known in the art and may be prepared by any of the well-known methods for preparing copolymeric siloxanes. One such method is that described and claimed in U. S. Patent 2,676,182. Preferably these copolymeric siloxanes should contain an average of from 1:1 to 1.5:1 methyl groups per silicon atom.

The superior release of the method of this invention is obtained when the "essential siloxanes" are employed alone and when they are admixed with other resinous or fluid materials either organic or organosilicon. When mixtures are employed the "essential siloxanes" must be employed in amount of at least 5% by weight based on the weight of the mixture. Specific examples of other resinous and fluid materials which can be admixed with the "essential siloxanes" are organosilicon compounds of the unit formula $$R_nSiO_{\frac{4-n}{2}} \text{ or } R_nSi-$$

in which $n$ has a value from 1 to 3 and R is any monovalent hydrocarbon radical such as alkyl radicals such as ethyl, methyl and octadecyl; alkenyl radicals such as vinyl, allyl and hexenyl; aryl hydrocarbon radicals such as phenyl, tolyl and xenyl; cycloaliphatic hydrocarbon radicals such as cyclohexyl and cyclohexenyl and aralkyl hydrocarbon radicals such as benzyl or any halogenated monovalent hydrocarbon radical such as trifluorovinyl, α,α,α - trifluoromethylphenyl, chlorophenyl, bromoxenyl and chlorotrifluoroethyl.

In addition the "essential siloxanes" of this invention may be admixed with organosilicon compounds of the unit formula $$R_nSiR'_{\frac{4-n}{2}}$$

in which R' is any divalent hydrocarbon radical such as methylene, ethylene, propylene, phenylene and cyclohexylene or any halogenated derivatives of such divalent hydrocarbon radicals. In addition organosilicon compounds which may be admixed with the "essential siloxanes" of this invention are those in which some of the silicon atoms are linked through oxygen atoms, some are linked directly to other silicon atoms and some are linked to divalent hydrocarbon radicals. When the "essential siloxanes" of this invention are employed as a mixture it is preferred that they constitute at least 10% by weight of the mixture.

The organosilicon compounds may be applied to the mold surface in any suitable form such as in liquid form, in solution in organic solvents, in solution in fluid organopolysiloxanes or in an aqueous emulsion. The compositions can be applied to the mold surface in any suitable manner such as by brushing, spraying or dipping. Preferably, however, the release composition should be on the mold in the form of a thin film. This is best obtained by rubbing the mold surface with a swab saturated with a solution of the material. Such rubbing tends to work the release agent into the pores of the mold and to give superior release.

After the organosiloxane is applied to the mold surface the mold may be employed immediately. Preferably however the "essential siloxane" coating should be cured by heating for a few minutes at from 100 to 250° C. This cures the "essential siloxane" resin thereby giving better release and increasing the number of releases obtainable before additional treatment of the mold is needed.

The method of this invention is applicable to any type of molded surface such as metal, wood, plastic or ceramic. As has been stated above the method of this invention is particularly useful in obtaining the release of silicone resin molded articles. It is also particularly useful in obtaining the release of organic plastic materials which are molded in wood or plastic molds. In this respect the method of this invention represents a substantial contribution to the molding art since most of the present-day commercial low-pressure molding of organic plastics is carried out in plastic or wood molds. The value of the contribution is apparent when it is realized that low-pressure molding is the only practical way of forming curved molded articles such as automobile bodies, airplane fuselages, boat hulls and the like. The use of the method of this invention has produced satisfactory release in plastic and wood molds where no other known composition either organic or organosilicon has proved to be satisfactory.

The following examples are illustrative only and are not to be construed as limiting the invention which is properly delineated in the appended claims.

*Example 1*

The organopolysiloxane resin employed in this example was a copolymer of 35 mol percent monophenylsiloxane and 65 mol percent monomethylsiloxane containing .162% by weight triethanolamine based on the weight of the resin. Glass cloth was impregnated with a 59.1% toluene solution of the above resin composition in such a manner that after impregnation and drying the material was composed of 55% by weight cloth and 45% by weight resin. The impregnated cloth was air-dried 30 minutes and then heated 10 minutes at 110° C. The cloth was then cut into squares and stacked in four layers which were then placed between steel plates which had been coated with a thin layer of one of the various materials listed below. Some of the coated plates were then cured as shown in Table I. In each case the laminates were molded at 175° C. for 30 minutes at a pressure of 1,000 p. s. i. The temperature was then raised to 250° C. and held there for 1 hour. The molded article was then removed from the press.

The various materials tested in this manner as release agents are listed below.

TABLE I

| Coating | Cured 3 hrs. at listed temp. |
|---|---|
| 1. Polytetrafluoroethylene | 60° F. |
| 2. Dimethylpolysiloxane of 500,000 cs. viscosity at 25°C | 250° C. |
| 3. Trimethyl end-blocked dimethylsiloxane having a viscosity of 125,000 cs. at 25° C. | 250° C. |
| 4. Copolymer of 80 mol percent stearylmethylsiloxane and 20 mol percent phenylmethylsiloxane. | None. |
| 5. Diphenylsilanediol | 250° C. |
| 6. Dimethylpolysiloxane oil containing silica aerogel thickener. | 250° C. |
| 7. A mixture of 15% by weight of a copolymer of trimethylsiloxane and SiO₂ having a methyl to silicon ratio of about 1.2:1 and 85% by weight of a copolymeric resin obtained by removing methylchlorosilanes boiling below 70° C. from the reaction product of methylchloride and silicon and thereafter hydrolyzing the distillation residue. The product contained silicon atoms having methyl, ethyl and propyl radicals attached thereto, a major portion of the silicon atoms being linked through Si—O—Si linkages and the remaining silicon atoms being linked through Si—Si linkages and Si—R'—Si linkages where R' is methylene and ethylene. | 250° C. |
| 8. A fluid copolymer of phenyldimethylsiloxane, diphenylsiloxane and dimethylsiloxane. | None |
| 9. Paraxenyldimethylphenylsilane | None. |
| 10. Diphenyldimethylsilane | None. |
| 11. Phenylmethylpolysilane resin | 250° C. |

In all of the above cases except No. 7 the laminate either stuck to the mold or acquired an undesirable surface during molding. The only satisfactory molding was obtained with composition 7 which gave excellent release and an unmarred surface on the molded article.

*Example 2*

The procedure of Example 1 was repeated except that the steel plates were treated with a dilute toluene solution of a copolymer of trimethylsiloxane and SiO₂ having a methyl to silicon ratio of 1.2:1. Excellent release was obtained and the surface of the molded article was satisfactory.

*Example 3*

A molding was made in accordance with the process of Example 1 except that the steel plates were rubbed with a cloth dampened with a solution composed of 50% by weight petroleum naphtha, 15% by weight of a copolymer fluid of trimethylsiloxane, dimethylsiloxane and monomethylsiloxane and 35% by weight of a copolymer of trimethylsiloxane units and SiO₂ units having a methyl to silicon ratio of 1.2:1. After application of the release composition, the steel plates were cured at 250° C. for 2 hours. The molding was then carried out in the manner of Example 1 and excellent release was obtained.

*Example 4*

In the molding of resin foams the release agent employed must produce satisfactory release of the foam from the mold surface without distorting the cell structure of the foam. The resin employed to make the foams in this example had a composition of 31.3 mol percent phenylmethylsiloxane, 31.3 mol percent monophenylsiloxane, 31.3 mol percent monomethylsiloxane and 6.1 mol percent diphenylsiloxane. This resin contained about .02% by weight based on the weight of the resin of beta-hydroxyethyltrimethylammonium - 2-ethylhexoate. 100 parts by weight of the resin composition were mixed with 20 parts by weight diatomaceous earth and 1.5 parts by weight p,p'-oxy-bis-benzenesulfonylhydrazide. Sheets of foam were prepared from this resin between aluminum plates as described below.

In each case the resin-filler composition was placed between the aluminum plates and heated at a temperature above 130° C. until the resin had foamed and had cured to a non-tacky state. In each case the aluminum panels were coated with one of the compositions shown below. After foaming and curing of the resin was complete and aluminum panels were removed and if there was any sticking or any distortion of the cell structure, the coating agent for the aluminum was considered an unsatisfactory release agent. The materials tried as release agents were as follows:

(1) Carnauba wax.
(2) 350 cs. trimethylsiloxane end-blocked dimethylsiloxane fluid.
(3) Fluid copolymer of trimethylsiloxane, dimethylsiloxane and phenylmethylsiloxane.
(4) A copolymeric siloxane obtained by removing methyl chlorosilanes boiling above 70° C. from the reaction product of methyl chloride and silicon and thereafter hydrolyzing the distillation residue. This copolymer had methyl, ethyl and propyl groups attached to some of the silicon atoms, a majority of the silicon atoms being connected by Si—O—Si linkages and the remaining silicon atoms being connected by Si—Si linkages and Si—R'—Si linkages in which R' is methylene and ethylene.
(5) Tetrabutyltitanate.
(6) An aqueous emulsion of trimethyl end-blocked polysiloxane fluid.
(7) Dimethylpolysiloxane grease thickened with silica.
(8) Calcium stearate.
(9) Ethylpolysilicate.
(10) Methylcellulose.
(11) Fluid trimethyl end-blocked methylhydrogen polysiloxane.
(12) Copolymer of epichlorihydrin and p,p'-iso-propylidenediphenol, commonly known as epoxy resins.
(13) 68% toluene solution of a copolymer of trimethylsiloxane and SiO₂ having a methyl to silicon ratio of about 1.2:1.
(14) An acetone solution containing 1 part by weight of a copolymer of trimethylsiloxane and SiO₂, having a methyl to silicon ratio of 1.2:1, 1 part by weight of a fluid copolymer of trimethylsiloxane, phenylmethylsiloxane and dimethylsiloxane and 2 parts by weight acetone.

Satisfactory release without cell distortion was obtained only with compositions 13 and 14.

Example 5

A solution of 50% by weight petroleum naphtha, 15% by weight of a trimethylsiloxy end-blocked dimethylpolysiloxane fluid and 35% by weight of a copolymer of trimethylsiloxane units and $SiO_2$ units having a methyl to silicon ratio of 1.2:1 was applied to epoxy resin molds in a commercial molding operation wherein polyester resins were being molded. Satisfactory release was obtained under conditions where a standard commercial polysiloxane mold release emulsion containing a trimethylsiloxy end-blocked dimethylpolysiloxane fluid had proved to be quite unsatisfactory.

Equivalent results are obtained when the polyester resins are molded in wooden molds.

Example 6

Satisfactory release is obtained when a copolymer of trimethylsiloxane and $SiO_2$ having a methyl to silicon ratio of 1.5:1 is employed as the release agent in the molding of rubber, phenolic resins, polystyrene, polyamides and copolymers of monophenylsiloxane, monomethylsiloxane and dimethylsiloxane, copolymers of trifluorovinylmethylsiloxane, $\alpha,\alpha,\alpha$ - trifluoromethylphenylmethylsiloxane and monoethylsiloxane, and copolymers of monovinylsiloxane, phenylmethylsiloxane and styrene.

That which is claimed is:

1. A method of molding plastic articles which comprises forming organic and organosilicon plastic articles in a mold selected from the group consisting of wood, plastic, ceramic and metal molds, the molding surfaces of which have been coated with (1) an organosilicon composition comprising a copolymer consisting essentially of trimethylsiloxane units and $SiO_2$ units in such proportion that the ratio of methyl radicals to silicon atoms is from 1:1 to 2.5:1 inclusive and thereafter removing the molded article from the mold, the plastic article being formed from any plastic material other than (1).

2. A method in accordance with claim 1 wherein the plastic is an organopolysiloxane resin.

3. A method of molding plastic articles which comprises forming organic and organosilicon plastic articles in a mold selected from the group consisting of wood, plastic, ceramic and metal molds, the molding surfaces of which have been coated with (1) an organosilicon composition comprising a copolymer consisting essentially of trimethylsiloxane units and $SiO_2$ units in such proportion that the ratio of methyl radicals to silicon atoms is from 1:1 to 1.5:1 and thereafter removing the article from the mold, the plastic article being formed from any plastic material other than (1).

4. A method in accordance with claim 3 wherein the plastic is an organopolysiloxane resin.

5. A method comprising molding organic and organosilicon plastic articles in a mold selected from the group consisting of wood, ceramic, plastic and metal molds, the molding surfaces of which are coated with a mixture comprising at least 5% by weight of (1) a copolymeric siloxane consisting essentially of trimethylsiloxane units and $SiO_2$ units in which the methyl to silicon ratio is from 1:1 to 2.5:1, the remainder of said mixture being composed of (2) an organopolysiloxane having from 1 to 3 organic radicals selected from the group consisting of monovalent hydrocarbon radicals and halogenated monovalent hydrocarbon radicals, per silicon atom and in said siloxane at least a majority of the silicon atoms are connected by Si—O—Si linkages, any remaining silicon atoms being connected by linkages selected from the group consisting of Si—Si and Si—R'—Si where R' is a divalent hydrocarbon radical, and thereafter releasing the plastic article from the mold, the plastic article being formed of any plastic material other than (1).

6. A method comprising forming organic and organosilicon plastic articles in a mold selected from the group consisting of wood, ceramic, plastic and metal molds, the molding surfaces of which are coated with a mixture containing at least 5% by weight of (1) a copolymeric organosiloxane consisting essentially of trimethylsiloxane units and $SiO_2$ units in amount such that the ratio of methyl to silicon is from 1:1 to 2.5:1, the remainder of the mixture being (2) a fluid methylpolysiloxane free of $SiO_2$ units and thereafter releasing the plastic article from the mold, the plastic article being composed of any plastic material other than (1).

7. A method in accordance with claim 6 wherein the plastic is an organopolysiloxane resin.

8. A method comprising molding organic and organosilicon plastic articles in a mold selected from the group consisting of wood, ceramic, plastic and metal molds, the molding surfaces of which are coated with a mixture of at least 5% by weight of (1) a copolymeric organosiloxane consisting essentially of trimethylsiloxane units and $SiO_2$ units in such proportion that the ratio of methyl to silicon is from 1:1 to 2.5:1, the remainder of said mixture being composed of (2) a fluid methylphenylsiloxane and thereafter removing the molded article from the mold, the plastic article being composed of any plastic material other than (1).

9. A method in accordance with claim 8 wherein the plastic is an organopolysiloxane resin.

References Cited in the file of this patent

UNITED STATES PATENTS

| | | |
|---|---|---|
| 2,478,165 | Collins | Aug. 2, 1949 |
| 2,588,367 | Dennett | Mar. 11, 1952 |

FOREIGN PATENTS

| | | |
|---|---|---|
| 652,557 | Great Britian | Apr. 25, 1951 |

OTHER REFERENCES

Ziegler: "Plastics Technology," India Rubber World, September 1946, pp. 826–829.